(12) United States Patent
Archer et al.

(10) Patent No.: US 7,783,627 B2
(45) Date of Patent: Aug. 24, 2010

(54) DATABASE RETRIEVAL WITH A UNIQUE KEY SEARCH ON A PARALLEL COMPUTER SYSTEM

(75) Inventors: Charles Jens Archer, Rochester, MN (US); Amanda Peters, Rochester, MN (US); Gary Ross Ricard, Chatfield, MN (US); Albert Sidelnik, Urbana, IL (US); Brian Edward Smith, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 430 days.

(21) Appl. No.: 11/830,387

(22) Filed: Jul. 30, 2007

(65) Prior Publication Data

US 2009/0037376 A1    Feb. 5, 2009

(51) Int. Cl.
*G06F 7/00*   (2006.01)

(52) U.S. Cl. .............................. 707/720; 712/223; 711/5

(58) Field of Classification Search ...................... 707/3, 707/720, 999.001, 999.002, 999.003; 711/100, 711/147, 153, 5; 712/223
See application file for complete search history.

(56) References Cited

U.S. PATENT DOCUMENTS

2003/0048785 A1*  3/2003  Calvignac et al. ........... 370/392

OTHER PUBLICATIONS

IBM and Lawrence Livermore National Laboratory, An Overview of the BlueGene/L SuperComputer, 2002, IEEE, pp. 1-22.*

* cited by examiner

*Primary Examiner*—Khanh B Pham
*Assistant Examiner*—Amy Ng
(74) *Attorney, Agent, or Firm*—Martin & Associates, LLC; Bret J. Petersen

(57) ABSTRACT

An apparatus and method retrieves a database record from an in-memory database of a parallel computer system using a unique key. The parallel computer system performs a simultaneous search on each node of the computer system using the unique key and then utilizes a global combining network to combine the results from the searches of each node to efficiently and quickly search the entire database.

14 Claims, 5 Drawing Sheets

DATABASE RETRIEVAL WITH A UNIQUE KEY SEARCH ON A PARALLEL COMPUTER SYSTEM

RELATED APPLICATION

This application is related to patent application Ser. No. 11/737,209, to Charles J. Archer, et al., filed on Apr. 19, 2007, entitled "PARALLEL-PREFIX BROADCAST FOR A PARALLEL-PREFIX OPERATION ON A PARALLEL COMPUTER", which is herein incorporated by reference. This application is also related to patent application Ser. No. 11/830,463, to Charles J. Archer, et al., filed on even date herewith, entitled "DATABASE RETRIEVAL WITH A NON-UNIQUE KEY ON A PARALLEL COMPUTER SYSTEM", which is herein incorporated by reference.

BACKGROUND

1. Technical Field

This disclosure generally relates to a database on a parallel computer system, and more specifically relates to a method and apparatus for database retrieval with a unique key search in an in-memory database in a parallel computer system.

2. Background Art

Databases are computerized information storage and retrieval systems. A database system is structured to accept commands to store, retrieve and delete data using, for example, high-level query languages such as the Structured Query Language (SQL). The term "query" denominates a set of commands for retrieving data from a stored database. The query language requires the return of a particular data set in response to a particular query. In a typical database structure, data is contained in a flat file partitioned into records or rows which are further partitioned into fields. A "key" is a string comprised of one or more fields from each record or row that can be used to retrieve information from the database using a query. There is a 1-to-1 correspondence between keys and records/rows. Keys are generally stored in collated order in an "index" The index is searched for a leading substring of a key and, if that substring is found, the corresponding records/rows are the result. A unique key search is one where the search substring can, because of constraints on the data, only result in a single search result. Thus a search will result in only one record/row.

Databases and database queries are also used in computer systems with a large number of compute nodes. Massively parallel computer systems are one type of parallel computer system that have a large number of interconnected compute nodes. A family of such massively parallel computers is being developed by International Business Machines Corporation (IBM) under the name Blue Gene. The Blue Gene/L system is a scalable system in which the current maximum number of compute nodes is 65,536. The Blue Gene/L node consists of a single ASIC (application specific integrated circuit) with 2 CPUs and memory. The full computer is housed in 64 racks or cabinets with 32 node boards in each rack.

Computer systems such as Blue Gene have a large number of nodes, each with its own processor and memory. This characteristic provides the opportunity to provide an in-memory database, where some portions of the database, or the entire database resides completely in-memory. An in-memory database could provide an extremely fast response time for searches or queries of the database. In-memory databases pose new challenges and opportunities for computer databases administrators to utilize the full capability of an in-memory database. In particular, a parallel computer system such as Blue Gene has hardware that supports a global combining network that connects the nodes in a tree where each node has one or two children. The tree network has a built-in arithmetic logic unit (ALU) to perform reductions of data packets as they move along the network.

The prior art techniques for searching an in-memory database have not taken advantage of the network structures available in parallel computer systems such as Blue Gene. Without a way to effectively search an in-memory database, parallel computer systems will not be able to fully utilize the potential power of an in-memory database in a parallel computer system.

SUMMARY

A method and apparatus is disclosed to retrieve a database record from an in-memory database of a parallel computer system using a unique key. The parallel computer system performs a simultaneous search on each node of the computer system using the unique key and then utilizes a global combining network to combine the results from the searches of each node to efficiently and quickly search the entire database.

The disclosed examples herein are directed to a massively parallel computer system with multiple networks but the claims herein apply to any computer system with one or more networks and a number of parallel nodes.

The foregoing and other features and advantages will be apparent from the following more particular description, as illustrated in the accompanying drawings.

BRIEF DESCRIPTION OF DRAWINGS

The disclosure will be described in conjunction with the appended drawings, where like designations denote like elements, and.

DETAILED DESCRIPTION

A method and apparatus is disclosed to retrieve a database record from an in-memory database having a unique key on a parallel computer system. The parallel computer system performs a simultaneous search on each node of the computer system using the unique key and then utilizes a global combining network to combine the results from the searches of each node to efficiently and quickly search the entire database. The detailed description is given with respect to the Blue Gene/L massively parallel computer being developed by International Business Machines Corporation (IBM). However, those skilled in the art will appreciate that the mechanisms and apparatus of the disclosure and claims apply equally to any parallel computer system with multiple nodes and networks.

Figure 1:
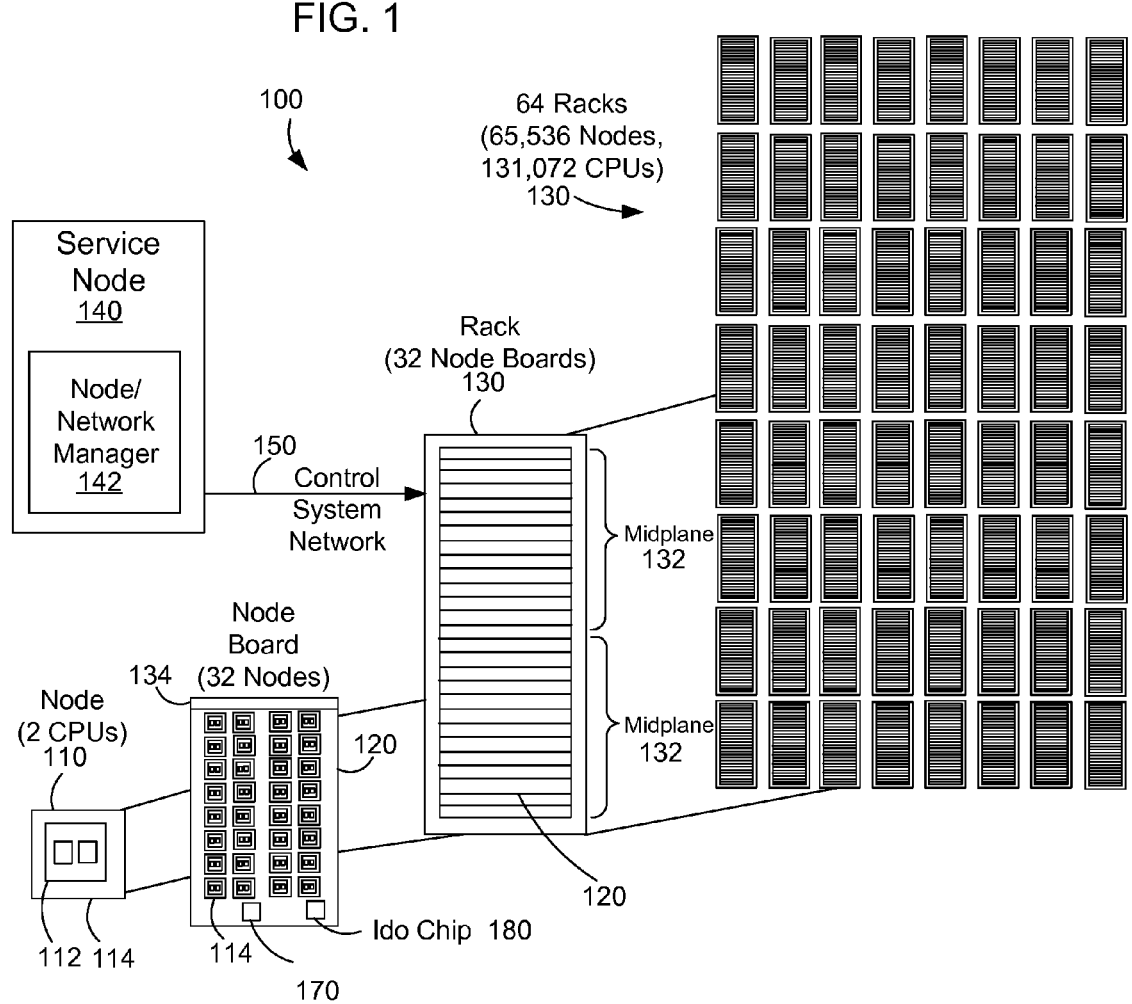
FIG. 1 is a block diagram of a parallel computer with a search mechanism for an in-memory database that facilitates database retrieval with a unique key index.

FIG. 1 shows a block diagram that represents a massively parallel computer system 100 that incorporates many of the features in the Blue Gene/L computer system. The Blue Gene/L system is a scalable system in which the maximum number of compute nodes is 65,536. Each node 110 has an application specific integrated circuit (ASIC) 112, also called a Blue Gene/L compute chip 112. The compute chip incorporates two processors or central processor units (CPUs) and is mounted on a node daughter card 114. The node also typically has 512 megabytes of local memory (not shown). A node board 120 accommodates 32 node daughter cards 114 each having a node 110. Thus, each node board has 32 nodes, with 2 processors for each node, and the associated memory for each processor. A rack 130 is a housing that contains 32 node boards 120. Each of the node boards 120 connect into a midplane printed circuit board 132 with a midplane connector 134. The midplane 132 is inside the rack and not shown in FIG. 1. The full Blue Gene/L computer system would be housed in 64 racks 130 or cabinets with 32 node boards 120 in each. The full system would then have 65,536 nodes and 131,072 CPUs (64 racks×32 node boards×32 nodes×2 CPUs).

The Blue Gene/L computer system structure can be described as a compute node core with an I/O node surface, where communication to 1024 compute nodes 110 is handled by each I/O node that has an I/O processor 170 connected to the service node 140. The I/O nodes have no local storage. The I/O nodes are connected to the compute nodes through the logical tree network and also have functional wide area network capabilities through a gigabit Ethernet network (not shown). The gigabit Ethernet network is connected to an I/O processor (or Blue Gene/L link chip) 170 located on a node board 120 that handles communication from the service node 140 to a number of nodes. The Blue Gene/L system has one or more I/O processors 170 on an I/O board (not shown) connected to the node board 120. The I/O processors can be configured to communicate with 8, 32 or 64 nodes. The service node uses the gigabit network to control connectivity by communicating to link cards on the compute nodes. The connections to the I/O nodes are similar to the connections to the compute node except the I/O nodes are not connected to the torus network.

Again referring to FIG. 1, the computer system 100 includes a service node 140 that handles the loading of the nodes with software and controls the operation of the whole system. The service node 140 is typically a mini computer system such as an IBM pSeries server running Linux with a control console (not shown). The service node 140 is connected to the racks 130 of compute nodes 110 with a control system network 150. The control system network provides control, test, and bring-up infrastructure for the Blue Gene/L system. The control system network 150 includes various network interfaces that provide the necessary communication for the massively parallel computer system. The network interfaces are described further below.

The service node 140 manages the control system network 150 dedicated to system management. The control system network 150 includes a private 100-Mb/s Ethernet connected to an Ido chip 180 located on a node board 120 that handles communication from the service node 140 to a number of nodes. This network is sometime referred to as the JTAG network since it communicates using the JTAG protocol. All control, test, and bring-up of the compute nodes 110 on the node board 120 is governed through the JTAG port communicating with the service node. In addition, the service node 140 includes a node/network manager 142. The node/network manager 142 comprises software in the service node and may include software in the nodes to manage the nodes and software applications that are executing on the nodes. The service node 140 further includes a search mechanism 144 to perform an in-memory database search as described herein. Portions of the search mechanism 144 may execute on the service node while other portions of the search mechanism are loaded into the nodes (shown as 144 in FIG. 2). The in-memory database search may be initiated from the service node or from the compute nodes 110. The search mechanism 144 is described more fully below. The software described herein may also be stored on a computer recordable media such as a CD-ROM.

The Blue Gene/L supercomputer communicates over several communication networks. The 65,536 computational nodes and 1024 I/O processors 170 are arranged into both a logical tree network and a logical 3-dimensional torus network. The torus network logically connects the compute nodes in a lattice like structure that allows each compute node 110 to communicate with its closest 6 neighbors. Other communication networks connected to the node include a JTAG network and a the global interrupt network. The JTAG network provides communication for testing and control from the service node 140 over the control system network 150 shown in FIG. 1. The global interrupt network is used to implement software barriers for synchronization of similar processes on the compute nodes to move to a different phase of processing upon completion of some task. Further, there are clock and power signals to each compute node 110.

Figure 2:
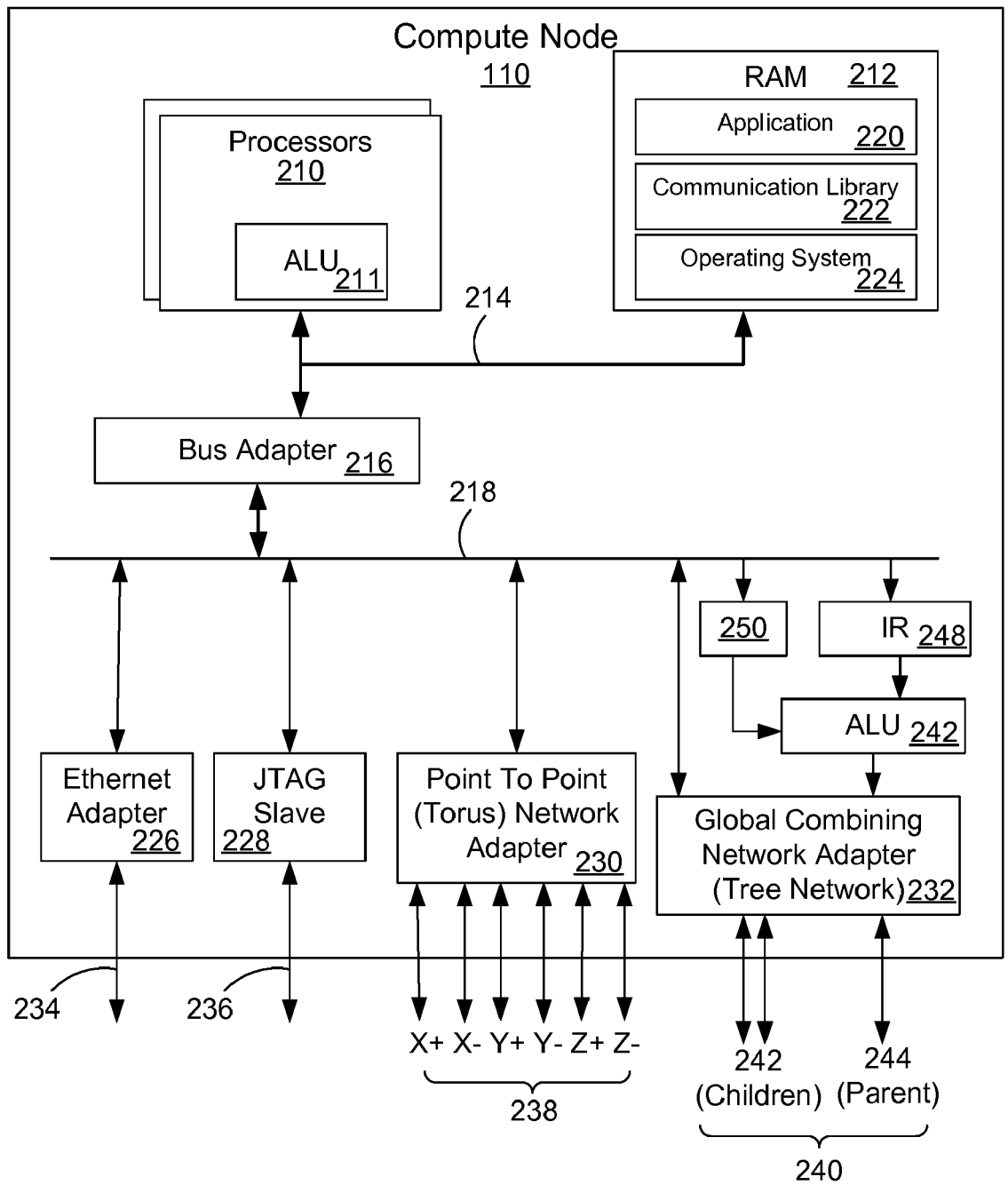
FIG. 2 is a block diagram of a compute node to illustrate the network connections to the compute node.

FIG. 2 sets forth a block diagram of an exemplary compute node as introduced above. The compute node 110 of FIG. 2 includes a plurality of computer processors 210, each with an arithmetic logic unit (ALU) 211 as well as random access memory ('RAM') 212. Processors 210 are connected to RAM 212 through a high-speed memory bus 214. Also connected to the high-speed memory bus 214 is a bus adapter 216. The bus adapter 216 connects to an extension bus 218 that connects to other components of the compute node. Stored in RAM 212 is an application program 220, a module of computer program instructions that carries out parallel, user-level data processing using parallel algorithms. Also stored in RAM 212 is a parallel communications library 222, a library of computer program instructions that carry out parallel communications among compute nodes, including point to point operations as well as collective operations. Application program 220 executes collective operations by calling software routines in parallel communications library 222.

Also stored in RAM 212 is an operating system 224, a module of computer program instructions and routines for an application program's access to other resources of the compute node. The quantity and complexity of tasks to be performed by an operating system on a compute node in a parallel computer are typically smaller and less complex than those of an operating system on typical stand alone computer. The operating system may therefore be quite lightweight by comparison with operating systems of general purpose computers, a pared down version as it were, or an operating system developed specifically for operations on a particular parallel computer. Operating systems that may usefully be improved, simplified, for use in a compute node include UNIX™, Linux™, Microsoft XP™, AIX™, IBM's i5/OS™, and others as will occur to those of skill in the art.

As introduced above, the RAM 212 includes a search mechanism 144 which may work in concert with a portion of the search mechanism 144 residing in the service node 140 as shown in FIG. 1. The search mechanism 144 includes software instructions to s search the in-memory database using the global combining network 240, which is described more fully below. A portion of the in-memory database is shown to reside on the compute note 110 as database data 256.

The compute node 110 of FIG. 2 includes several communications adapters 226, 228, 230, 232 for implementing data communications with other nodes of a parallel computer. Such data communications may be carried out serially through RS-232 connections, through external buses such as USB, through data communications networks such as IP networks, and in other ways as will occur to those of skill in the art. Communications adapters implement the hardware level of data communications through which one computer sends data communications to another computer, directly or through a network.

The data communications adapters in the example of FIG. 2 include a Gigabit Ethernet adapter 226 that couples example compute node 110 for data communications to a Gigabit Ethernet 234. Gigabit Ethernet is a network transmission standard, defined in the IEEE 802.3 standard, that provides a data rate of 1 billion bits per second (one gigabit). Gigabit Ethernet is a variant of Ethernet that operates over multimode fiber optic cable, single mode fiber optic cable, or unshielded twisted pair.

The data communications adapters in the example of FIG. 2 include a JTAG Slave circuit 228 that couples the compute node 110 for data communications to a JTAG Master circuit over a JTAG network 236. JTAG is the usual name used for the IEEE 1149.1 standard entitled Standard Test Access Port and Boundary-Scan Architecture for test access ports used for testing printed circuit boards using boundary scan. JTAG boundary scans through JTAG Slave 236 may efficiently configure processor registers and memory in compute node 110.

The data communications adapters in the example of FIG. 2 include a Point To Point Network Adapter 230 that couples the compute node 110 for data communications to a network 238. In Blue Gene, the Point To Point Network is typically configured as a three-dimensional torus or mesh. Point To Point Adapter 230 provides data communications in six directions on three communications axes, x, y, and z, through six bidirectional links 238: +x, −x, +y, −y, +z, and −z.

The data communications adapters in the example of FIG. 2 include a Global Combining Network Adapter 232 that couples the compute node 110 for data communications to a network 240 configured as a binary tree. Global Combining Network Adapter 232 provides data communications through three bidirectional links: two links 242 to children nodes and one link 244 to a parent node. The Global Combining Network Adapter 232 of each node has additional hardware to support operations on the global combining network as described further below.

The compute node 110 includes a second ALU 246 that is dedicated to the exclusive use of Global Combining Network Adapter 232 for use in performing the arithmetic and logical functions of reduction operations on the Global Combining Network 240. Computer program instructions of a reduction routine in parallel communications library 222 may latch an instruction for an arithmetic or logical function into instruction register 248. When the arithmetic or logical function of a reduction operation is a 'sum' or a 'logical or,' for example, Global Combining Network Adapter 232 may execute the arithmetic or logical operation by use of ALU 211 in processor 210 or, typically much faster, by use of the dedicated ALU 246 using data provided by other nodes on the global combining network 240 and data provided by the processor 210 on the compute node 110. In such a manner, computer program instructions in the parallel communications library 222 may configure the ALU 246 of the adapter 232 to perform a specified function such as a parallel-prefix operation. The compute node 110 may then perform the parallel-prefix operation with the ALU 246 on a global combining network adapter 232 for the global combing network 240 using data provided by nodes on the children network 242 and the compute node 110. The ALU output may then be passed up to the parent node on the parent network 244.

An instruction performed on the Global Combining Network Adapter 232 that is of particular interest herein is an all reduce "OR" operation. An all reduce operation combines all the elements provided in an input buffer of each processor in the group using a common operation and then returns the combined value in an output buffer on all nodes. An all reduce OR operation is all reduce operation where the operator on the data is a bitwise "OR" operation, where the "OR" is done on a bit, by bit basis as is known in the art. In the all reduce OR operation herein, the search information on each node is combined to give a search result for the in-memory database. To perform the all reduce OR operation on the compute node shown in FIG. 2, the contents of a contribution buffer 252 in the RAM 212 is compared with inputs from the children nodes on the links 242 and the results is loaded into the results buffer 254. Since the size of the data is such that the ALU 242 is not able to operate on all the data at once, a portion of the contribution buffer 252 is loaded into a contribution register 250 and the results of the operation is stored in a results register 255 and then passed to the results buffer 254 in RAM 212. The local results in the results buffer 254 of the all reduce "OR" operation is then passed to the parent node. The same operation is then repeated on each node up the tree network as shown in FIG. 3 described further below.

Often when performing arithmetic operations, such as the all reduce "OR" operation or a parallel-prefix operations, the global combining network adapter 232 serves to combine data received from the children nodes and pass the result up the network 240 to the parent node. Similarly, the global combining network adapter 232 may only serve to transmit data received from the parent node and pass the data down the network 240 to the children nodes. Thus, the processors 210 on the compute node 110 are not loaded by the ALU 242 transaction to pass data up or down the global combining network 240. A processor 210 may inject the identity element into the dedicated ALU 242 for the particular arithmetic operation being perform in the ALU 246 in order to prevent alteration of the output of the ALU 246 when the node should not be modifying the data for the operation. The contribution registers 250 injects an identity element that corresponds to the particular arithmetic operation performed by the ALU. For an "OR" operation this would be a zero. For example, when performing an all reduce "OR" operation, the global combining network adapter 232 performs a bitwise OR on the data received from the children nodes, and the results contributed by the local node is a null (For example, in a unique key search there was no match found on a search of the local node), the contribution register 250 injects zeros because that is the identity element for this operation. This will result in the node passing up zeros to the next node in the tree.

Figure 3:
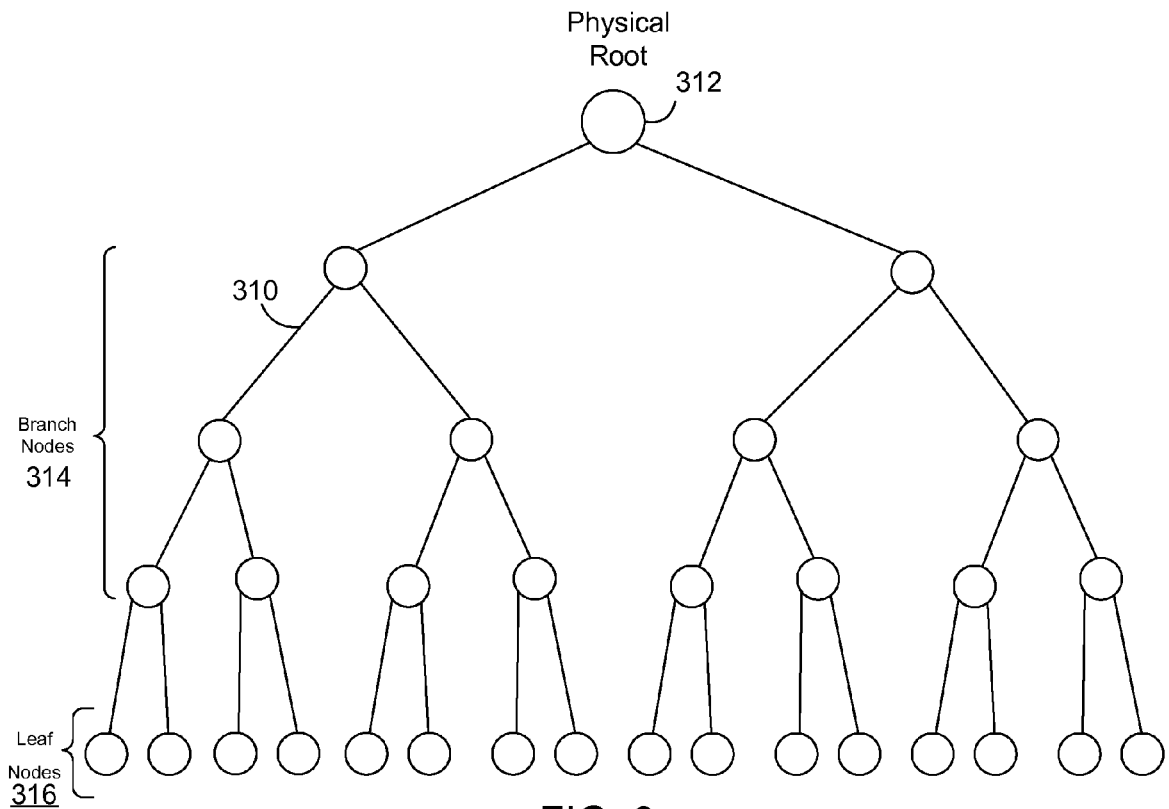
FIG. 3 is a block diagram representing a global combining network in a parallel computer system.

FIG. 3 shows a binary tree 300 illustrating an exemplary global combining network. The example data communications network of FIG. 3 includes data communications links connected to the compute nodes so as to organize the compute nodes as a tree. In the example of FIG. 3, circles represent compute nodes 110 of a parallel computer, and the lines between the circles represent data communications links 310 between compute nodes. The data communications links 310 are implemented with global combining network adapters similar to the one illustrated for example in FIG. 2, with each node typically providing data communications to and from two children nodes and data communications to and from a parent node, with some exceptions. Nodes in the global combining network may be characterized as a physical root node 312, branch nodes 314, and leaf nodes 316. The physical root node 312 has two children but no parent. The leaf nodes 316 each has a parent, but leaf nodes have no children. The branch nodes 314 each has both a parent and two children. The links and compute nodes are thereby organized by this data communications network optimized for collective operations into a binary tree 300. For clarity of explanation, the data communications network of FIG. 3 is illustrated with only 31 compute nodes, but readers will recognize that a global combining network may contain only a few compute nodes or may contain thousands of compute nodes.

In the example of FIG. 3, each node 110 in the tree is assigned a unit identifier referred to as a 'rank' 318. A node's rank 318 uniquely identifies the node's location in the tree network for use in both point to point and collective operations in the tree network. The ranks in this example are assigned as integers beginning with 0 assigned to the root node 312, 1 assigned to the first node in the second layer of the tree, 2 assigned to the second node in the second layer of the tree, 3 assigned to the first node in the third layer of the tree, 4 assigned to the second node in the third layer of the tree, and so on. For ease of illustration, only the ranks of the first three layers of the tree are shown here, but all compute nodes in the tree network are assigned a unique rank.

In the example of FIG. 3, the global combining network 300 provides data communications among all the nodes 110 in the binary tree to effect parallel reduction operations. Each ranked node has a contribution buffer 252 for storing the contribution of the ranked compute node and a results buffer 254 for storing results of a parallel reduction operation. Each node performs the reduce operation using the node's contribution and the contributions from the child nodes below that node. That node then passes the result of the operation up to that node's parent node. In such a manner, all the results cascade up to the physical root node 312 into a final result for the entire operation across all the nodes of the tree. Upon the results reaching the physical root node 312, the physical root 312 sends the result of the entire operation back down the tree to each compute node 110 such that the requesting node will have the results data.

Figure 4:
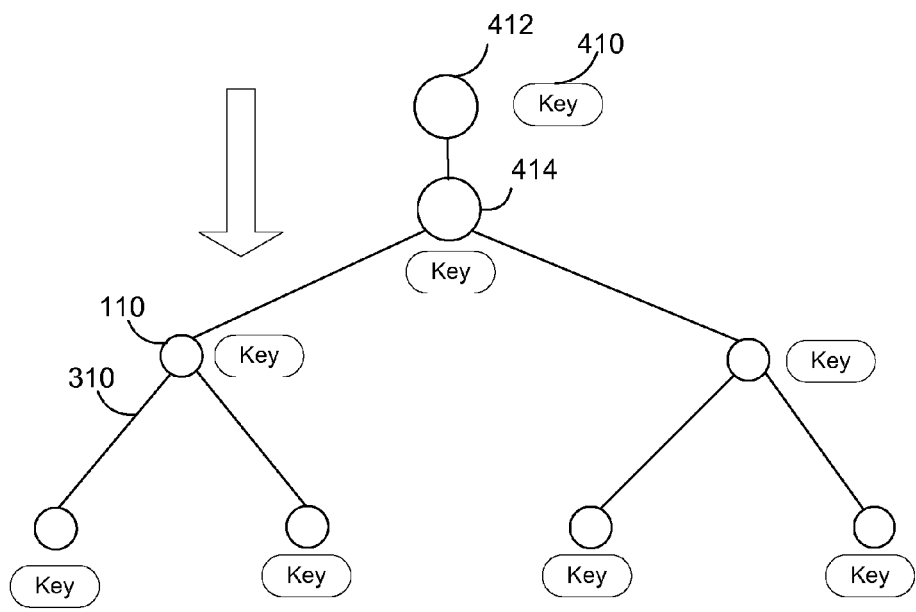
FIG. 4 is a block diagram of a global combining network to illustrate an example of broadcasting a key to each node.

FIG. 4 illustrates a global combining network 400 to retrieve a database record from an in-memory database having a unique key on a parallel computer system. The global combining network 400 is similar to the network described above with reference to FIG. 3. The global combining network 400 includes a requesting node 412 that initiates a search for a data record in the in-memory database residing on the nodes 110. The requesting node 412 appears as a unique node in FIG. 4 for illustration purposes, but in reality may be any other node in the network. The requesting node 412 may be the physical root node 414, any of the leaf or branch nodes 110, or it may be from the service node 140 shown in FIG. 1. The requesting node 412 initiates a database search by broadcasting a key 410 to each node in the global combining network 400. Each of the nodes 110 pass the key 410 to any child nodes until all the nodes have the key 410 as shown.

Figure 5:
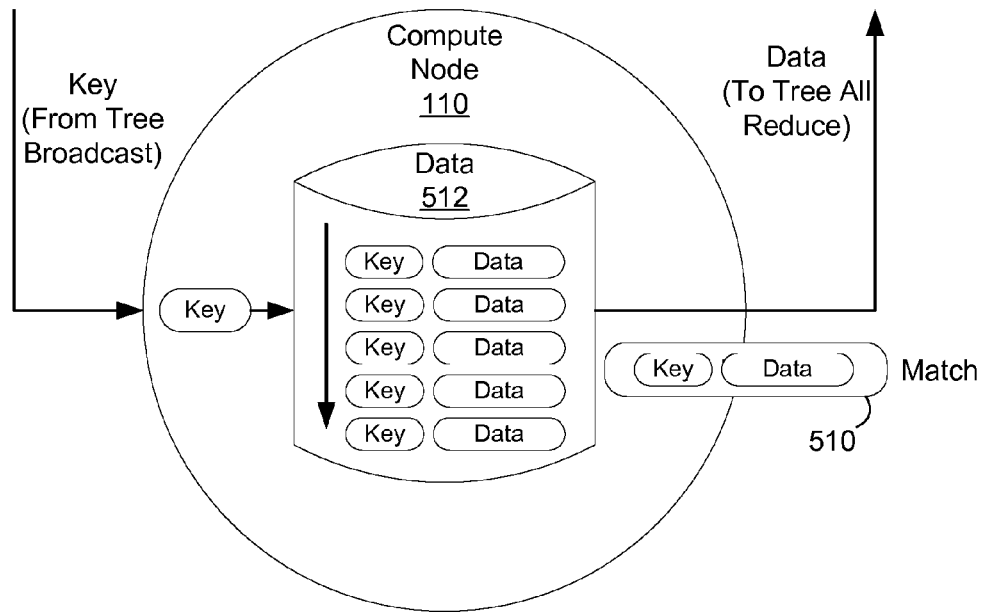
FIG. 5 is a block diagram that illustrates searching the in-memory database of a node for data corresponding to the key broadcast to each node in FIG. 4.

FIG. 5 shows a node 110 on the global combining network 400 (FIG. 4) to further illustrate a unique key search of an in-memory database on a parallel computer system. The compute node 110 receives a unique key 410 that is broadcast to the whole tree structure of the global combining network. The compute node 110 uses the key 410 to search the database data 256 in the local memory of the node. The database data 256 is the local portion of the in-memory database that is distributed over many nodes of the parallel computer system. Because there is a unique key, meaning the database has only one record for each key, there is no need to have a key index globally or on the compute node. The data can be searched without an index. The search may be accomplished through a compute node processor (212 in FIG. 2). The local search of the data 512 can be a sequential search or any other search known in the art. The local search finds a data record 510 that corresponds to the key 410. The matching data 510 is provided to the network through the global combining network adapter as described above and further discussed below.

Figure 6:
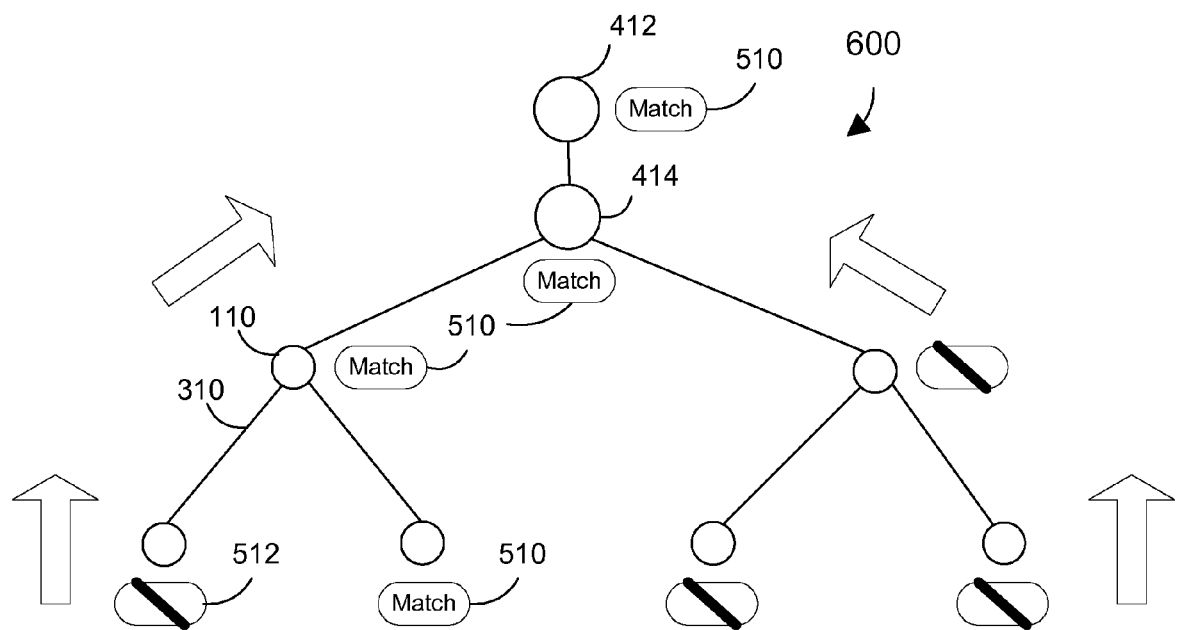
FIG. 6 is a block diagram that illustrates using the global combining network to combine the search results after searching the in-memory database of each node.

FIG. 6 shows the global combining network 400 (FIG. 4) as the matching data is sent to the physical root node 414 with a all reduce operation. After sending the initial request and the key 410, the requesting node would wait an appropriate amount of time and then initiate a tree all reduce operation. The node with a match 510 for the broadcast key stores the record in the results buffer of the node as described above. The other nodes, those with no match 512 (indicated by a slash through the node), all store "0" in the results buffer. A tree all reduce operation performs an "OR" function on the buffers of the global combining network so that the matching record is placed in the results buffer. This results buffer is then passed to the parent node and the process is repeated for each node on the network until the result with the matching data is placed in the physical root node 414. The matching data is then sent to the requesting node 412, which may be a node down the network or on the service node as described above.

Figure 7:
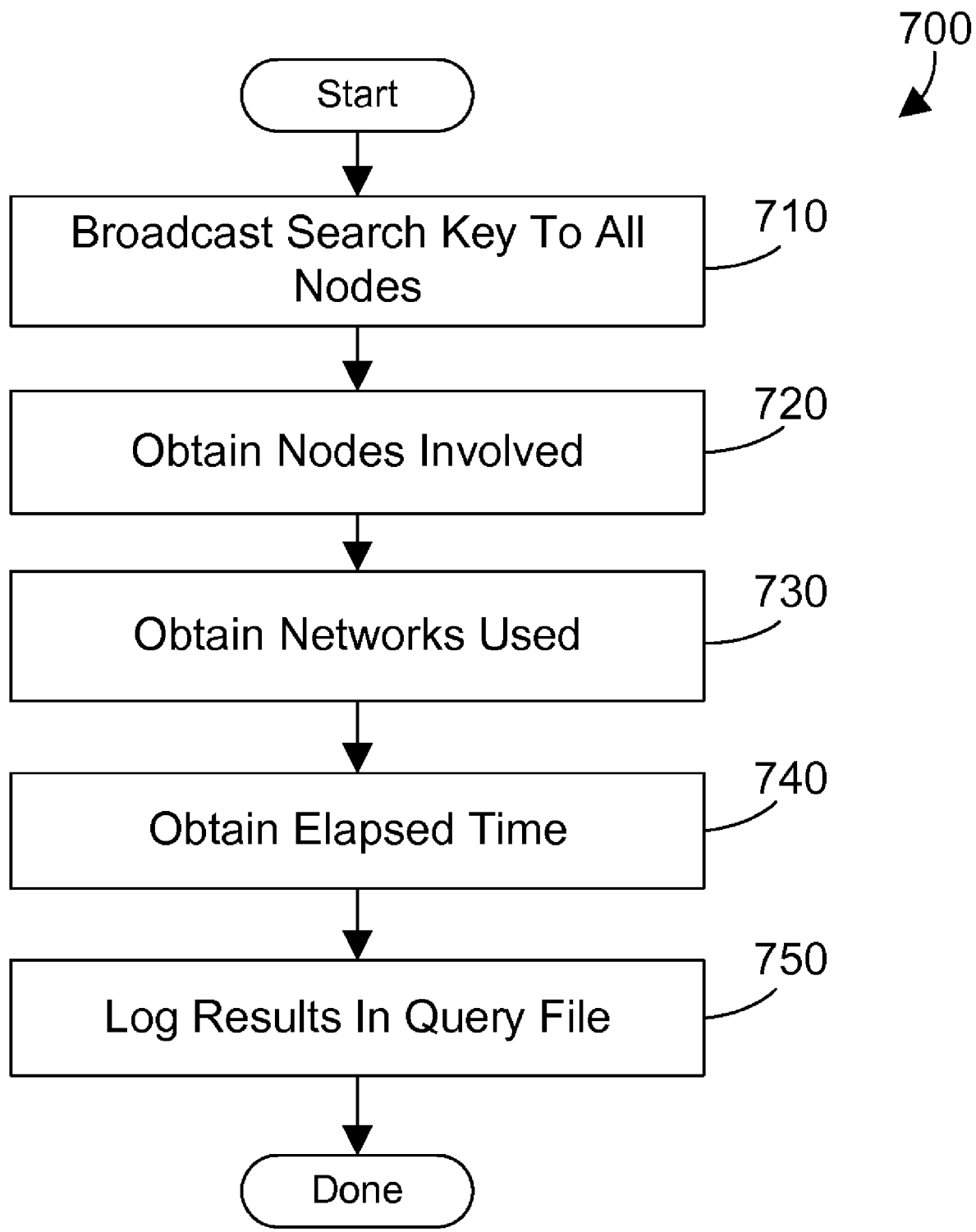
FIG. 7 is a method flow diagram for database retrieval from an in-memory database in a parallel database system.

FIG. 7 shows a method 700 for searching an in-memory database with a unique key index on a parallel computer system. The method may be executed on the processor of the compute nodes and/or the Global Combining Network Hardware as shown in FIG. 2. The method first broadcasts a search key to all the nodes in the relevant portion of the network (step 710). Next, each nodes searches its local portion of the in-memory database with the broadcast key (step 720). The node with a match for the broadcast key stores the record in the buffer (step 730). The other nodes, those with no match, all store "0" in the buffer (step 740). The method then performs a reduce operation that does an "OR" function on the buffers of the global combining network so that the matching record is placed in the results buffer of the root node (step 750).

The detailed description introduces a method and apparatus for retrieving a database record from an in-memory database using a unique key. The parallel computer system performs a simultaneous search on each node of the computer system using the unique key and then utilizes a global combining network to combine the results from the searches of each node to efficiently and quickly search the entire database. The method and apparatus utilize network resources of a parallel computer system to provide an efficient and high speed search of the database.

One skilled in the art will appreciate that many variations are possible within the scope of the claims. Thus, while the disclosure is particularly shown and described above, it will be understood by those skilled in the art that these and other changes in form and details may be made therein without departing from the spirit and scope of the claims.

What is claimed is:

1. A computer apparatus for searching an in-memory database comprising:
   a plurality of compute nodes each with a global combining network adapter coupled for data communications to a global combining network that connects the plurality of compute nodes in a tree structure with a parent node and a child node, each of the plurality of compute nodes having a processor and computer memory operatively coupled to the processor, the computer memory having disposed within it a portion of the in-memory database;

wherein the global combining network adapter comprises a dedicated arithmetic logic unit (ALU) that operates on data from a contribution buffer and places a result in a results buffer to perform a network all reduce operation;

a search mechanism in the computer memory that receives a unique search key and searches the portion of the in-memory database using the search key;

if a match for the key is found, the search mechanism stores a corresponding data record in the contribution buffer and if a match is not found the search mechanism stores zeros in the contribution buffer; and the search mechanism contributes to a network all reduce operation on the global combining network using the ALU to combine data received from the child node with the contents of the contribution buffer to form a result and passing the result to the parent node and the parent node performs a search in the same manner described above so that the network all reduce operation provides a result of searching the in-memory database on the plurality of compute nodes for the unique search key.

2. The computer apparatus of claim 1 further comprising a service node connected to the plurality of compute nodes that initiates a search of the in-memory database located within the compute nodes.

3. The computer apparatus of claim 1 further comprising a contribution register and a results register connected to the ALU that each hold a portion of the contribution buffer and results buffer respectively.

4. The computer apparatus of claim 1 wherein the all reduce operation performs a bitwise OR operation on the contents of the contribution register and data received from a child node.

5. The computer apparatus of claim 1 wherein the compute nodes are located in a massively parallel computer system.

6. A computer implemented method for searching an in-memory database on a parallel computer system comprising the steps of:

broadcasting a unique search key to a plurality of nodes; where each of the plurality of nodes includes a global combining network adapter coupled for data communications to a global combining network that connects the plurality of compute nodes in a tree structure with a parent node and a child node, each of the plurality of compute nodes having a processor and computer memory operatively coupled to the processor, the computer memory having disposed within it a portion of the in-memory database;

wherein the global combining network adapter comprises a dedicated arithmetic logic unit (ALU) that operates on data from a contribution buffer and places a result in a results buffer to perform a network all reduce operation;

initiating a search on each of the plurality of nodes using the search key;

on the node with a data record that matches the key, storing the data record in the contribution buffer;

on all the remaining nodes, storing zeros in the contribution buffer; and performing a network all reduce operation on the combining network on the plurality of nodes that combines data received from the child node with the contents of the contribution buffer to form a result and passes the result to the parent node and the parent node performs a search in the same manner described above so that the network all reduce operation provides a result of searching the in-memory database on the plurality of compute nodes for the unique search key.

7. The computer implemented method of claim 6 wherein the method is initiated from a service node connected to the plurality of compute nodes.

8. The computer implemented method of claim 6 wherein a contribution register and a results register connected to the ALU hold a portion of the contribution buffer and results buffer respectively.

9. The computer implemented method of claim 6 wherein the all reduce operation performs a bitwise OR operation on the contents of the contribution register and data received from a child node.

10. An article of manufacture for searching an in-memory database on a parallel computer, the article of manufacture comprising computer program instructions stored upon a computer recordable media, when executed by a computer processor performs the steps of:

broadcasting a unique search key to a plurality of nodes; where each of the plurality of nodes includes a global combining network adapter coupled for data communications to a global combining network that connects the plurality of compute nodes in a tree structure with a parent node and a child node, each of the plurality of compute nodes having a processor and computer memory operatively coupled to the processor, the computer memory having disposed within it a portion of the in-memory database;

wherein the global combining network adapter comprises a dedicated arithmetic logic unit (ALU) that operates on data from a contribution buffer and places a result in a results buffer to perform a network all reduce operation;

initiating a search on each of the plurality of nodes using the search key;

on the node with a data record that matches the key, storing the data record in the contribution buffer;

on all the remaining nodes, storing zeros in the contribution buffer; and performing a network all reduce operation on the combining network on the plurality of nodes that combines data received from the child node with the contents of the contribution buffer to form a result and passes the result to the parent node and the parent node performs a search in the same manner described above so that the network all reduce operation provides a result of searching the in-memory database on the plurality of compute nodes for the unique search key.

11. The article of manufacture of claim 10 wherein the method is initiated from a service node connected to the plurality of compute nodes.

12. The article of manufacture of claim 10 wherein a contribution register and a results register connected to the ALU hold a portion of the contribution buffer and results buffer respectively.

13. The article of manufacture claim 10 wherein the all reduce operation performs a bitwise OR operation on the contents of the contribution register and data received from a child node.

14. The article of manufacture of claim 10 wherein the compute nodes are located in a massively parallel computer system.

* * * * *